April 3, 1956   A. SMITH ET AL   2,740,246
LAWN MOWER WITH VARIABLE SPEED TRANSMISSION
Filed Oct. 27, 1954   2 Sheets-Sheet 2
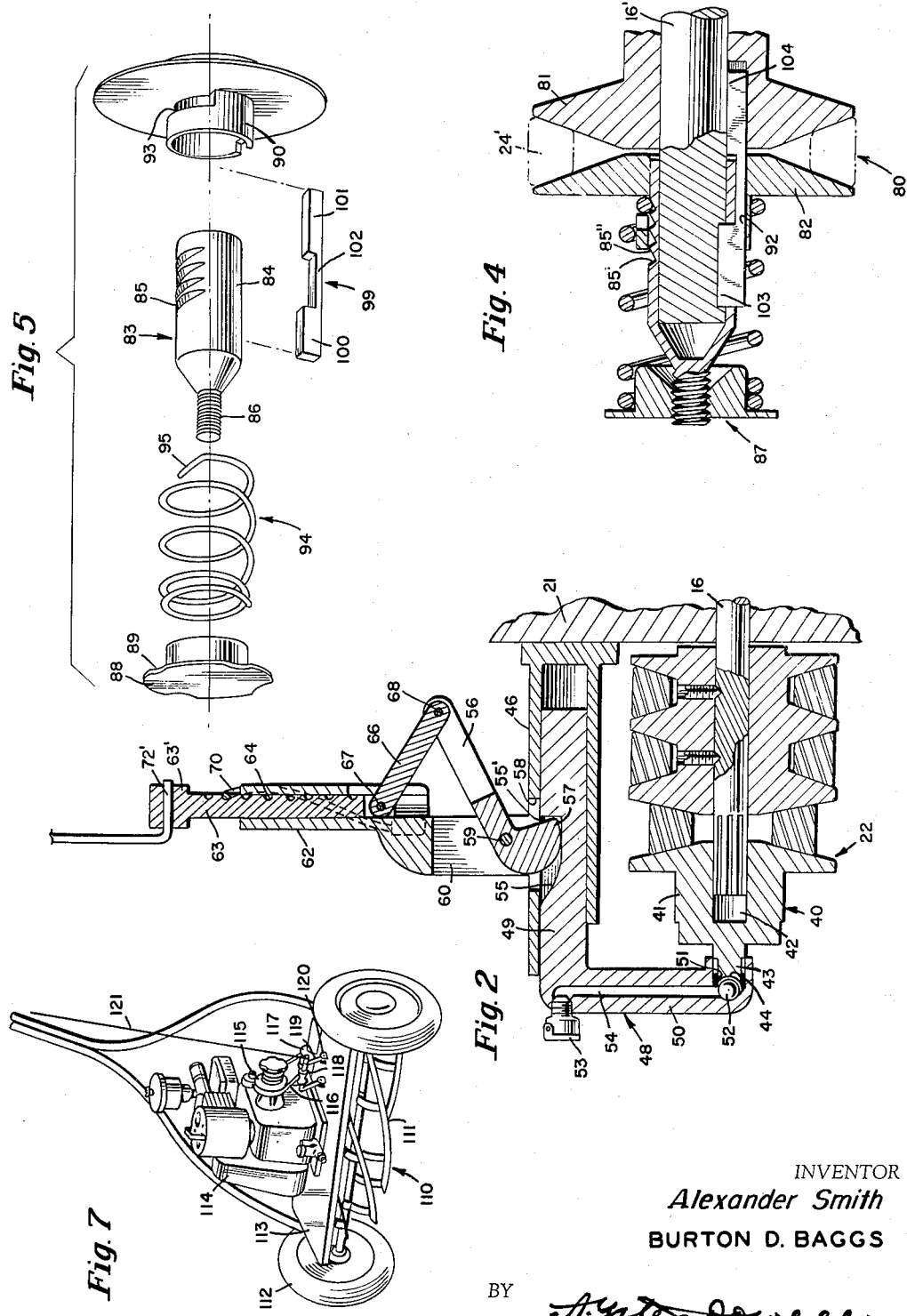
INVENTOR
*Alexander Smith*
BURTON D. BAGGS
BY
ATTORNEY United States Patent Office 2,740,246
Patented Apr. 3, 1956

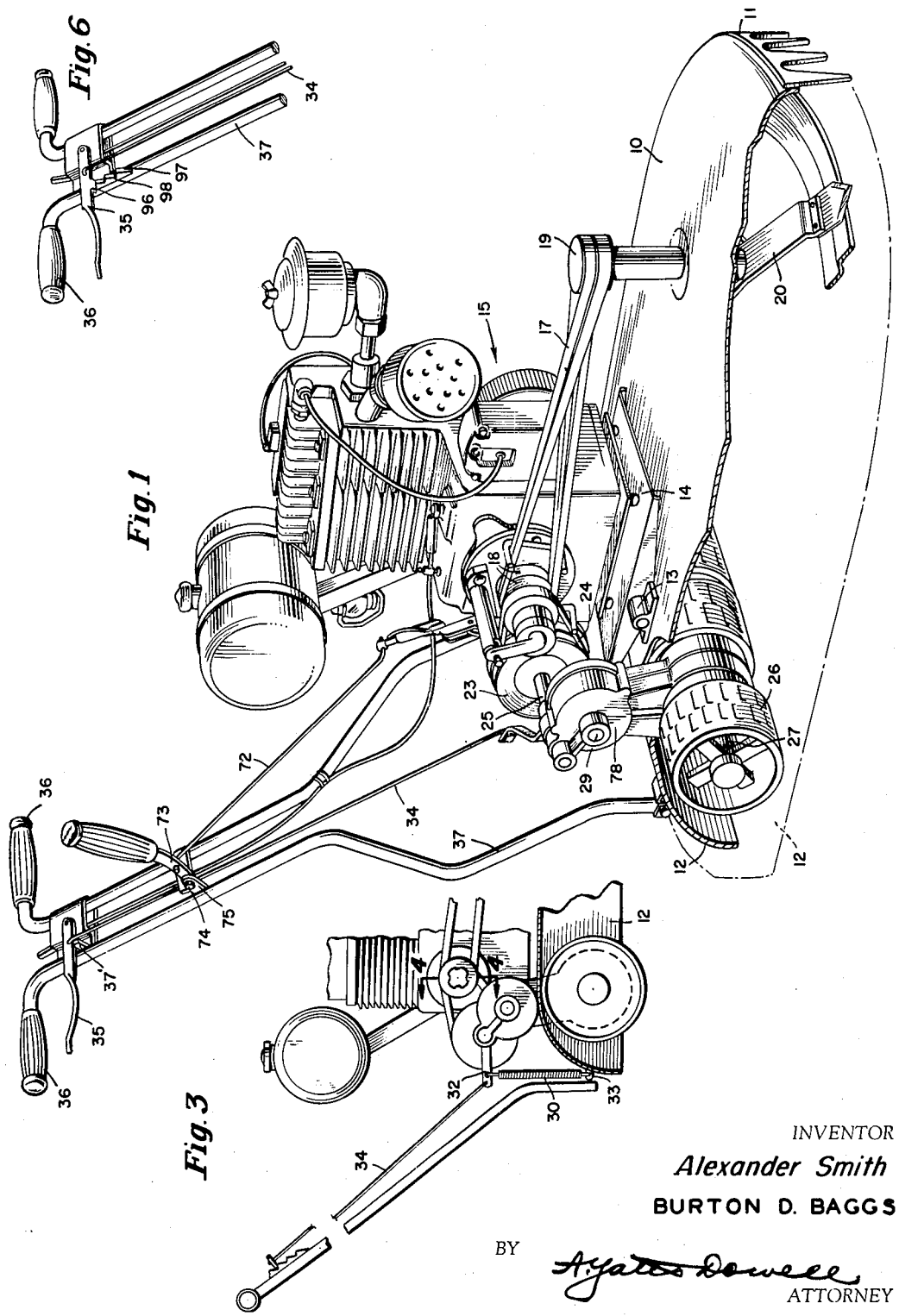

2,740,246

LAWN MOWER WITH VARIABLE SPEED TRANSMISSION

Alexander Smith and Burton D. Baggs, Sanford, Fla.

Application October 27, 1954, Serial No. 464,945

13 Claims. (Cl. 56—25.4)

This invention relates to harvesting and the transmission of power and more particularly to a variable speed drive for a power lawn mower.

Power driven lawn mowers have come into widespread use in recent years. These have been of two types primarily, namely, the reel and the rotary. The former has a plurality of helical blades which rotate around a horizontal axis against a stationary cutter bar. One objection to this type has been its inability to mow unusually tall grass or weeds or even to cut individual shoots of over a few inches height. The rotary type employs one or more knives or blades which rotate about a vertical axis at a rapid speed. It is capable of cutting exceptionally tall grass or weeds.

In order for the rotary to thoroughly cut unusually tall grass and weeds, as well as thick undergrowth, without the necessity of mowing over the same area more than once, it is necessary to propel it more slowly over such area than over areas that are easier to cut, or to increase the speed of rotation of the cutting member relative to its forward speed. Furthermore, in the mulching of grass, weeds and undergrowth, it is necessary that the intake to the mower be adjusted to the discharge, it being necessary that the material be finely shredded by the mower before such discharge.

Accordingly, it is an object of the present invention to provide a power driven mower with means for changing the speed ratio between the drive and the driven shafts, the control for which may be mounted conveniently for the operator's use.

A further object of the invention is to provide a variable speed drive adaptable to either a reel or a rotary type mower which is simple and sturdy in construction, inexpensive to manufacture, and easy to install and operate.

These and other objects and advantages of the invention will become apparent from the following description taken in conjunction with the accompanying drawings wherein:

Fig. 1 is a perspective of a power mower in accordance with the present invention on which one form of a variable speed drive according to the invention is employed, portions of the mower being broken away for clarity;

Fig. 2, an enlarged elevational view with parts broken away and shown in section of the variable speed drive of Fig. 1;

Fig. 3, a side elevation of the rear of a mower similar to that of Fig. 1 on which a modified type of variable speed drive is employed;

Fig. 4, a vertical section to an enlarged scale, on the line 4—4 of Fig. 3 illustrating the variable speed drive;

Fig. 5, an exploded view of the variable speed drive elements of Fig. 4;

Fig. 6, a perspective of the upper portion of the handle of the mower of Fig. 3; and, Fig. 7, a perspective of a reel type power mower illustrating the application thereto of the variable speed drive of Figs. 3–6.

Briefly stated the rotary mower illustrated includes a cover on which a source of power such as an internal combustion engine is mounted for driving a pair of sets of pulleys. One set drives belt means engaged with a spindle to which the rotatable knives are attached. The other drives a belt engaged with a sheave which drives propelling means through a transmission. In order to vary the speed of the propelling means, one of the sheave halves on the main drive shaft is adjustable toward and away from its mating sheave half. Suitable controls are provided on the handle for use by the operator.

Referring to the drawings, the mower includes a cover or deck 10 having a guard 11 at its forward end and depending side and rear walls 12. Mounted on the rear of the cover to the operator's left are a pair of bearing mountings 13 (one not shown) between which a base 14 is oscillatably mounted. An internal combustion engine 15 having crankshaft or drive shaft 16 is mounted on the base. Suitable means, not shown, are employed for rocking the base 14 and biasing it in forward or rearward position in order to loosen or tighten the drive belts 17 extending from the pulley 18 to the spindle 19 of the cutter member 20.

The outer sheave 22 drives sheave 23 by means of belt 24. Sheave 23 drives shaft 25 and causes rollers or wheels 26 to rotate on shaft 27 by means of transmission 29. In order to loosen or tighten the belt 24 the transmission is swingable about the roller shaft 27. Spring member 30 connected at one end to lever 32 attached to sheave 23 and at the other end to ear 33 at the lower end of the rear wall 12 tends to rock sheave 23 downwardly in order to tighten belt 24 for normal driving operation. Lever 32 is operable through rod 34 connected to lever 35 which is conveniently positioned near handles 36. The handles 36 are at the ends of tubular members 37 secured to the rear wall 12 of the cover 10. In Fig. 1 the lever 35 is supported in raised position by post 37', the belt 24 being in loose contact with the sheaves under such circumstances.

Referring more particularly to Fig. 2, the outer half 40 of sheave 22 is splined for axial movement on shaft 16. The sheave has a body portion 41 with a recess 42 therein for receiving the end of shaft 16. At the end remote from the sheave the sheave body has an axial extension 43 with a spherical bearing surface 44 at its extremity.

For controlling the position of the sheave member 40 on the shaft a sleeve 46 is connected to the engine housing 21. The sleeve extends parallel to and is spaced from the shaft 16, and has reciprocably mounted in it an operator member 48. The operator member is substantially L-shaped and has a shaft portion 49 slidable in the sleeve 46, and a transverse portion 50 with a recess 51 at its extremity for receiving the projection 43 of the sheave member 40. A hardened steel ball 52 is positioned between the end of the projecting member 43 and the interior of the recess 51. Lubrication thereto is afforded through fitting 53 and channel 54 in the transverse member 50.

Member 49 has a notch 55 which slopes gradually from the left as viewed in Fig. 2 and has an abrupt stop portion 55' at its right extremity. A cam member or actuator 56 has a lobe 57 extending through slot 58 in sleeve 46 for producing axial movement of the member 48. Actuator 56 is pivotally mounted by a pin 59 between a pair of supports 60 which are mounted on the sleeve 46. At the upper end of the supports a tube 62 is mounted in which a rod 63 having spaced notches 64 on its outer face is slidable.

At the lower end of the rod 63 one end of lever 66 is pivotally connected at 67, the other end being pivotally connected at 68 to the upper end of actuator 56. Spring biasing means 70 is connected to the supports 60 for engaging above the tube 62 any of the notches 64 of the rod 63 for holding it in adjusted position. Control rod 72 has its lower offset extremity 72' pivotally received in the head 63' of rod 63, the upper end of control rod 72 being pivotally received in control lever 73 which is pivotally mounted at 74 on ear 75 connected to the right tubular member 37.

In the operation of the device, when the lever 35 is lowered spring 30 will maintain drive belt 24 in tight condition. Under driving conditions tension on the belt is increased. Such tension tends to separate sheave member 40 from its mate. Accordingly, operation of the control lever 73 to move the control rod 72 and rod 63 to a low position as indicated in Fig. 2, permits the actuator 56 to be moved to the left, as viewed in Fig. 2, thus permitting separation of the sheave member 42 from its mate and causing operation in a low drive ratio. If a higher driving ratio is desired, upward motion of control lever 73 causes the actuator 56 to pivot about pin 59 to move member 48 inwardly and increase the effective diameter of sheave 22, the spring 30 maintains the belt 24 under proper tension. Various speed ratios may be obtained by positioning rod 63 at any desired position in which one of its notches 64 may be engaged by the spring means 70.

Accordingly, it will be understood that the invention described includes a variable speed drive for operating a driven shaft from a drive shaft by a conventional V belt in which means is provided for positioning a movable sheave half the desired distance from its mate, actuator means being provided to urge the sheave half toward its mate, the tension of the belt tending to separate the two.

The variable speed drive illustrated in Figs. 3 through 7 is applicable to various makes and types of mowers. Figs. 3 and 6 illustrate its application to a mower of the type shown in Fig. 1. Referring to Fig. 4, the crankshaft or drive shaft 16' has mounted on it a sheave 80, the right hand portion 81 of which is fixed on the shaft and the left hand portion 82 of which is slidable axially toward and away from the portion 81. In order to mount the portion 82 a sleeve 83 is provided which fits over the end of the shaft 16'. Sleeve 83 has a cylindrical body portion 84 with a plurality of spaced notches 85, the notches having their steep sides 85' to the left and the more gently inclined side 85" to the right as viewed in Figs. 4 and 5. At the outer end the sleeve 83 tapers to a threaded extension 86 for the reception of a fastener 87 which has a base 88 with finger engaging portions 89.

Sheave half 82 has sleeve 90 extending from its outer or flat side, the sleeve having a cutout portion or slot 93 around approximately one-third of its periphery immediately adjacent to the sheave 82. A keyway 92 extends beneath the sleeve 90 opposite to the cutout portion 93.

In order to keep the sleeve 83 in position on the shaft 16', a key 99 is provided having a relatively high portion 100, and a portion of less height 101 connected by a narrow neck 102. Shaft 16' has slots 103 and 104 for the reception of the portions 100 and 101, respectively, the neck 102 being received in the keyway 92 in sleeve 90.

For urging the sheave half 82 towards its mate 81 a spring 94 has one end against the base 88 of the fastener 87 and its other end against the outer face of the sheave half 82. The latter end 95 of the spring is bent inwardly toward the axis for reception in the cutout portion 93 of sleeve 90 and into any one of the grooves 85 of sleeve 84.

In order to adjust the tension on the belt 24' the control rod 34 is adjustable in steps by means of the lever 35' having a tang 96 engageable in a plurality of notches 97 on a toothed member 98 mounted on the tubular member 37' just below the handle 36. With this arrangement the tension on the belt 24' may be increased or decreased by degrees.

In the operation of the device, the fastener 87 is adjusted on the threaded extension 86 of the sleeve 83 until the compression of the spring 94 is just sufficient to move the sheave half 82 on the sleeve 84 and overcome the engaging force of the spring end 95 in any of the notches 85. When a lower gear is desired, all that is necessary is to move lever 35' into one of the lower notches. This will cause an increase in the tension of the belt 24' which will be sufficient to overcome the compression of the spring 94 and permit the sheave half 82 to move outwardly, the spring end 95 engaging one of the notches 85. In order to shift into a still lower gear the belt tension may be further increased by moving lever 35' to a lower notch. Shifting to a higher gear is accomplished by moving lever 35' to a higher notch, this movement decreasing the tension on the belt 24' and permitting the spring 94 to urge sheave half 82 toward its mate as far as the combined effect of the belt tension and notch engagement by the spring end will permit.

Although the variable speed drive illustrated in Figs. 3 through 6 is particularly useful with the mower illustrated in these figures, it is also useful with other types of mowers having a sheave drive.

For example, in Fig. 7, a reel type mower 110 is illustrated having blades 111, wheels 112, base 113, and internal combustion engine or other source of power 114. The internal combustion engine drives a pulley 115 which in turn drives a belt 116 for driving a second pulley 117. Pulley 115 may be constructed as indicated in Fig. 4 and the tension on belt 116 varied by suitable means such as idler roller 118 carried by lever 119 pivotally mounted at 120. Control rod 121 is connected to the lever 119 and extends to suitable shifting means as, for example, like that shown in Fig. 6. By adjusting the pull on control rod 121 the tension on belt 116 may be controlled to govern the actuation of the variable speed drive.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A harvester comprising a cover member, a power plant mounted at the rear thereof and having a drive shaft, a plurality of V belt sheaves on the drive shaft, a rotatable cutter, a V belt driving said cutter from one of said sheaves, wheel means mounting the cover and rotatable on a shaft, gear means operative to rotate the shaft, auxiliary sheave means for driving the gear means, V belt means for driving the auxiliary sheave means from one of the sheaves on the drive shaft, said auxiliary sheave means and gear means being swingable about the shaft of said wheel means whereby the distance between the drive shaft and the auxiliary sheave means may be varied, spring means extending between said cover and said gear means and tending to separate said auxiliary sheave means and said drive shaft, said one sheave on said drive shaft for driving said auxiliary sheave means having one half thereof fixedly mounted on said drive shaft and the other half slidably mounted thereon for rotation therewith, means mounted on said power plant and in rotatable engagement with the outer side of the slidably mounted sheave half, and means engaging said last mentioned means for urging said slidable sheave half toward said fixedly mounted sheave half.

2. A harvester comprising a cover member, a power plant mounted at the rear thereof and having a drive shaft, a plurality of V belt sheaves on the drive shaft, a rotatable cutter, a V belt driving said cutter from one of said sheaves, wheel means mounting the cover, auxiliary sheave means for driving the wheel means, V belt means for driving the auxiliary sheave means from one of the sheaves on the drive shaft, said auxiliary sheave means being movably mounted whereby the distance between the drive shaft and the auxiliary sheave means may be varied, resilient means tending to separate said auxiliary sheave means and said drive shaft, said sheave on said drive shaft for driving said auxiliary sheave means having one half thereof fixedly mounted on said drive shaft and the other half slidably mounted thereon for rotation therewith, and means engaging said slidable sheave half for urging it toward said fixedly mounted sheave half.

3. A variable speed drive comprising a drive shaft, a driven shaft spaced from said drive shaft, a V belt sheave on said drive shaft and having bearing means extending axially therefrom, one half of said sheave being fixedly mounted on said shaft, the other half being slidably mounted on the outer end of said shaft for rotation therewith, a sleeve mounted parallel to said shaft, an operator member slidable in said sleeve and having a lateral extension rotatably receiving said bearing means, said sleeve having a slot intermediate its ends, said operator member having a recessed engaging means, a cam in contact with the engaging means for moving it axially, means on the sleeve pivotally mounting the cam, a socket mounted on the pivotal mounting means and transversely thereof, a rod slidable into said socket, link means connecting one end of the rod to the cam whereby slidable movement of the rod causes the cam to pivot, said rod having a plurality of spaced grooves along its length, a spring pressed dog for engaging one of the grooves at a time to resiliently hold the rod in adjusted position in the socket, and lever means connected to the rod for moving the rod to the desired position.

4. A variable speed drive comprising a drive shaft, a driven shaft spaced from said drive shaft, a V belt sheave on said drive shaft, one half of said sheave being fixedly mounted on said shaft, the other half being slidably mounted on said shaft for rotation therewith and having bearing means on its outer surface, a support mounted adjacent to said shaft, an operator member movable along said support and having a lateral extension rotatably receiving said bearing means, cam means in contact with the operator member for moving it, means mounting the cam on the support, a socket mounted on the pivotal mounting means and transversely thereof, a rod slidable into said socket, link means connecting one end of the rod to the cam, whereby slidable movement of the rod causes the cam to pivot, said rod having a plurality of spaced grooves along its length, a spring pressed dog for engaging one of the grooves at a time to resiliently hold the rod in adjusted position in the socket, and lever means connected to the rod for moving the rod to the desired position.

5. A variable speed drive comprising a drive shaft, a driven shaft spaced from said drive shaft, a V belt sheave on said drive shaft, one half of said sheave being fixedly mounted on said shaft, the other half being slidably mounted on said shaft for rotation therewith and having bearing means on its outer surface, a support mounted adjacent to said shaft, an operator member movable on said support and having means rotatably receiving said bearing means, actuator means for moving the operator member to urge the slidably mounted sheave half toward the fixedly mounted sheave half, and means for holding the actuator means in a desired position.

6. A variable speed drive comprising a drive shaft, a driven shaft spaced from said drive shaft, a V belt sheave on said drive shaft, one half of said sheave being fixedly mounted on said shaft, the other half being slidably mounted on said shaft for rotation therewith and having bearing means on its outer surface, a support mounted adjacent to said shaft, an operator member movable along said support and having a lateral extension rotatably receiving said bearing means, and means for moving said operator member and holding it in the desired position whereby the distance between said sheave halves may be regulated at will.

7. A harvester having a main shaft, a second shaft carrying a cutter member, and drive means between the main and second shafts, a third shaft in spaced relation from the main shaft, a sheave mounted on the third shaft, means mounting the third shaft for limited movement toward and away from said main shaft, V belt sheave means on said main shaft, one half of said sheave means being fixedly mounted on said main shaft, the other half being slidably mounted on said main shaft but restrained from rotation relative thereto, V belt means driving the third shaft from the main shaft, and means for adjustably varying the spacing of said sheave halves from each other.

8. A variable speed drive for operating a driven shaft from a drive shaft by means of a V belt, comprising a V belt sheave on said drive shaft, a first half of said sheave being fixedly mounted on said shaft, the second half being slidably mounted on said shaft for rotation therewith, the V belt when under tension tending to move said slidably mounted sheave half away from the first sheave half, means for holding said second sheave half in the desired spaced relation with said first sheave half, and control means for said holding means remotely located from said sheave for causing said second sheave half to move away from or toward said first sheave half.

9. A variable speed drive for operating a driven shaft from a drive shaft by means of a V belt, comprising a V belt sheave on said drive shaft, a first half of said sheave being fixedly mounted on said shaft, the second half being slidably mounted on said shaft for rotation therewith, the V belt when under tension tending to move said slidably mounted sheave half away from the first sheave half, and means engaged with said second sheave half and positionable relative to said first sheave half for permitting said second sheave half to move away from said first sheave half a desired amount and for urging said second sheave half toward said first sheave half.

10. A variable speed drive comprising a drive shaft having a keyway slot of limited extent, a driven shaft spaced from said drive shaft, a V belt sheave on said drive shaft, one half of said sheave being fixedly mounted on said drive shaft, a sleeve mounted on said drive shaft adjacent to said one half and extending over the end of said shaft, said sleeve having a longitudinal slot for the reception of a key, a plurality of spaced transverse notches along its length, and a threaded reduced extension at its other end, a second sheave half for cooperation with said first sheave half, said second sheave half having a collar extending from its outer face, said collar being of a size to receive said sleeve therethrough and having a transverse slot adjacent to the outer face and a longitudinal slot on its inner surface, a fastener connected to said threaded extension and having an extended base, a spring around said sleeve an abutting said extended base and said outer face and having an end extending through said slot in said collar into engagement with a notch on said sleeve, and a key having a thick end and a relatively thin end connected by a narrower neck, the neck being positioned in said slot in said collar, the thick end in said keyway slot in said drive shaft, and the thin end in said slot in said sleeve.

11. A variable speed drive comprising a drive shaft, a driven shaft spaced from said drive shaft, a V belt sheave on said drive shaft, one half of said sheave being fixedly mounted on said drive shaft, a sleeve mounted on said drive shaft adjacent to said one half and extending over the end of said shaft, said sleeve having a plurality of spaced transverse notches along its length, and a threaded reduced extension at its other end, a second sheave half for cooperation with said first sheave half, said second sheave half having a collar extending from its outer face, said collar being of a size to receive said sleeve therethrough and having a transverse slot adjacent to the outer face, a fastener connected to said threaded extension and having an extended base, a spring around said sleeve and abutting said extended base and said outer face and having an end extending through said slot in said collar into engagement with at notch on said sleeve, and means for retaining said sleeve on said drive shaft.

12. A variable speed drive V belt sheave, one half of said sheave being fixedly mounted on a shaft, comprising a sleeve mounted on said shaft adjacent to said one half and extending over the end of said shaft, said sleeve having a plurality of spaced transverse notches along its length, and a threaded reduced extension at its other end, a second sheave half for cooperation with said first sheave half, said second sheave half having a collar extending from its outer face, said collar being of a size to receive said sleeve therethrough and having a transverse slot adjacent to the outer face, a fastener connected to said threaded extension and having an extended base, a spring around said sleeve and abutting said extended base and said outer face and having an end extending through said slot in said collar into engagement with a notch on said sleeve, and means for retaining said sleeve on said shaft.

13. A variable speed drive V belt sheave, one half of said sheave being fixedly mounted on a shaft, comprising a sleeve mounted on said shaft adjacent to said one half, said sleeve having one or more spaced transverse notches along its length, a second sheave half for cooperation with said first sheave half, said second sheave half having a collar extending from its outer face, said collar being of a size to receive said sleeve therethrough and having a transverse slot, a spring around said sleeve and having an end abutting said outer face and having a portion extending through said slot in said collar into engagement with a notch on said sleeve, means on said sleeve abutting the other end of said spring, and means for retaining said sleeve on said shaft.

References Cited in the file of this patent

UNITED STATES PATENTS

| | | |
|---|---|---|
| 2,385,360 | Johnson et al. | Sept. 25, 1945 |
| 2,615,343 | Koch | Oct. 28, 1952 |
| 2,691,421 | Swanson | Oct. 12, 1954 |
| 2,701,436 | Harnett | Feb. 8, 1955 |